(12) United States Patent
Miyata

(10) Patent No.: US 7,686,328 B2
(45) Date of Patent: Mar. 30, 2010

(54) MOTORCYCLE AIRBAG SYSTEM AND MOTORCYCLE

(75) Inventor: Yasuhito Miyata, Minato-Ku (JP)

(73) Assignee: Takata Corporation, Tokyo (JP)

( * ) Notice: Subject to any disclaimer, the term of this patent is extended or adjusted under 35 U.S.C. 154(b) by 280 days.

(21) Appl. No.: 11/626,748

(22) Filed: Jan. 24, 2007

(65) Prior Publication Data

US 2007/0170704 A1   Jul. 26, 2007

(30) Foreign Application Priority Data

Jan. 25, 2006   (JP) .............................. 2006-016838

(51) Int. Cl.
*B60R 21/02* (2006.01)
*B60R 21/231* (2006.01)

(52) U.S. Cl. ............... 280/730.1; 280/743.1; 280/743.2

(58) Field of Classification Search ............. 280/730.1, 280/743.2, 743.1
See application file for complete search history.

(56) References Cited

U.S. PATENT DOCUMENTS 6,007,090 A   12/1999   Hosono et al.

| | | | |
|---|---|---|---|
| 2003/0214122 A1 | 11/2003 | Miyata | |
| 2004/0150197 A1* | 8/2004 | Iijima et al. | ............... 280/730.1 |
| 2004/0207189 A1* | 10/2004 | Miyata | ..................... 280/743.2 |
| 2005/0040628 A1* | 2/2005 | Miyata | ..................... 280/730.1 |

FOREIGN PATENT DOCUMENTS

| | | |
|---|---|---|
| DE | 10 2004 016 364 A | 11/2005 |
| JP | 2002-137777 | 5/2002 |
| JP | 2002-137779 | 5/2002 |
| JP | 2002-137780 | 5/2002 |
| JP | 2003-011871 | 1/2003 |

OTHER PUBLICATIONS

A search report dated May 15, 2007, from the European Patent Office in corresponding European Application No. 07000702.6-2425.

* cited by examiner

*Primary Examiner*—Paul N. Dickson
*Assistant Examiner*—Timothy Wilhelm
(74) *Attorney, Agent, or Firm*—Fitch, Even, Tabin & Flannery

(57) ABSTRACT

A technique is provided effective in improving rider retraining performance of an airbag in a motorcycle airbag system to be mounted to a motorcycle. In a first form, an airbag system to be mounted to a motorcycle restricts the deployment of the airbag toward the rider's head in an early stage of the inflation of the airbag in the event of a head-on collision of the motorcycle using a webbing that tethers the airbag to the motorcycle.

11 Claims, 10 Drawing Sheets

US 7,686,328 B2

MOTORCYCLE AIRBAG SYSTEM AND MOTORCYCLE

FIELD OF THE INVENTION

The present invention relates to a technique of constructing an airbag system to be mounted to a motorcycle.

BACKGROUND OF THE INVENTION

Various techniques for restraining the rider of a motorcycle with an airbag system mounted to the motorcycle are known. For example, known techniques include a technique of restraining the rider of a motorcycle in the event of a head-on collision by inflating an airbag housed in a case mounted to the body frame (refer to Japanese Unexamined Patent Application Publication No. 2002-137777). The technique presents the possibility of providing a wide restraint area of the airbag. However, for an airbag system to be mounted to a vehicle in which the periphery of the rider is open, such as a motorcycle, there is a great demand for improving the performance of restraining the rider by inflating the airbag in a desired state in the event of a head-on collision.

SUMMARY OF THE INVENTION

The present invention is made in view of this point. Accordingly, it is an object of the invention to provide a technique effective in improving the performance of restraining a rider by an airbag in a motorcycle airbag system to be mounted to a motorcycle.

In order to attain the above object, the invention described in the following claims is provided. The invention described in the claims is typically applicable to the construction of the airbag system to be mounted in various kinds of motorcycle. In this specification, "a motorcycle," a typical example of vehicles, includes various straddle-type vehicles that a rider straddles.

A first form of the present invention for solving the problems is a motorcycle airbag system to be mounted to a motorcycle, and includes at least a housing case, an airbag, an inflator, a gas supply section, and a webbing.

The housing case of the invention is to be mounted to a motorcycle. The airbag of the invention is housed in the housing case and is inflatable through an opening at the top of the housing case. The inflator of the invention is housed in the housing case and generates airbag-inflation gas.

The gas supply section of the invention has the function of supplying the airbag-inflation gas generated by the inflator to the airbag. The webbing of the invention is a long member fixed at one end to the motorcycle and stitched at the other end to the airbag so as to tether the airbag to the motorcycle.

In the motorcycle airbag system with this arrangement, the airbag-inflation gas generated by the inflator is supplied to the airbag through the gas supply section in a head-on collision of the motorcycle, so that the airbag protrudes out of the housing case through the opening of the housing case to deploy into a rider restraint region. The "head-on collision" here broadly includes collisions with a running or still object in front of the motorcycle, for example, another vehicle, a pedestrian, or an obstacle. The "rider restraint region" here is defined as a space extending in the direction of the forward movement of a rider, for restraining the rider who is flung ahead of the motorcycle by a kinetic energy during a head-on collision.

It is desirable for the airbag system of this type to be mounted to a motorcycle that the airbag not only deploy to the rider restraint region ahead of the rider but also deploy according to the situation. Specifically, when the airbag first inflates toward the head of the rider who leans forward at a head-on collision of the motorcycle, the load from the airbag applied in the direction opposite to the moving direction of the rider may be applied to the rider's head.

Accordingly, the webbing of the invention tethers the airbag to the motorcycle and is disposed above the airbag to thereby restrict the deployment of the airbag toward the rider's head in the early stage of the deployment of the airbag. Thus, the airbag first deploys a rider's-chest restraint portion toward the rider's chest to push the rider's chest with the rider's-chest restraint portion, thereby raising the upper body of the rider, and then deploys a rider's-head restraint portion toward the rider's head to thereby restrain the rider's head with the rider's-head restraint portion. Thus the load on the rider's head from the airbag can be reduced in the early stage of the deployment of the airbag.

The arrangement of the airbag system according to the first form of the invention allows the rider restraint performance of the airbag to be improved by using the webbing for restricting the deployment of the airbag toward the ride's head in the early stage of the deployment of the airbag in the head-on collision of the motorcycle. The invention particularly provides a strategic arrangement in which the webbing for tethering the airbag to the motorcycle is also used as a device for restricting the deployment of the airbag toward the rider's head.

A second form of the present invention for solving the problems is a motorcycle equipped with an airbag system in which an airbag deploys into a rider restraint region to restrain the rider in a head-on collision of the motorcycle, wherein the airbag system is the motorcycle airbag system according to the first form of the invention.

The invention according to the second form of the invention therefore provides a motorcycle equipped with an airbag system having an airbag with improved rider restraint performance.

As described above, in a motorcycle airbag system in which an airbag deploys into a rider restraint region in front of the rider to restrain the rider when supplied with airbag-inflation gas in a head-on collision of the motorcycle, the present invention allows the rider restraint performance of the airbag to be improved by restricting the deployment of the airbag toward the rider's head in the early stage of the deployment of the airbag in the head-on collision of the motorcycle using a webbing that tethers the airbag to the motorcycle.

DETAILED DESCRIPTION OF THE PREFERRED EMBODIMENTS

Figure 1:
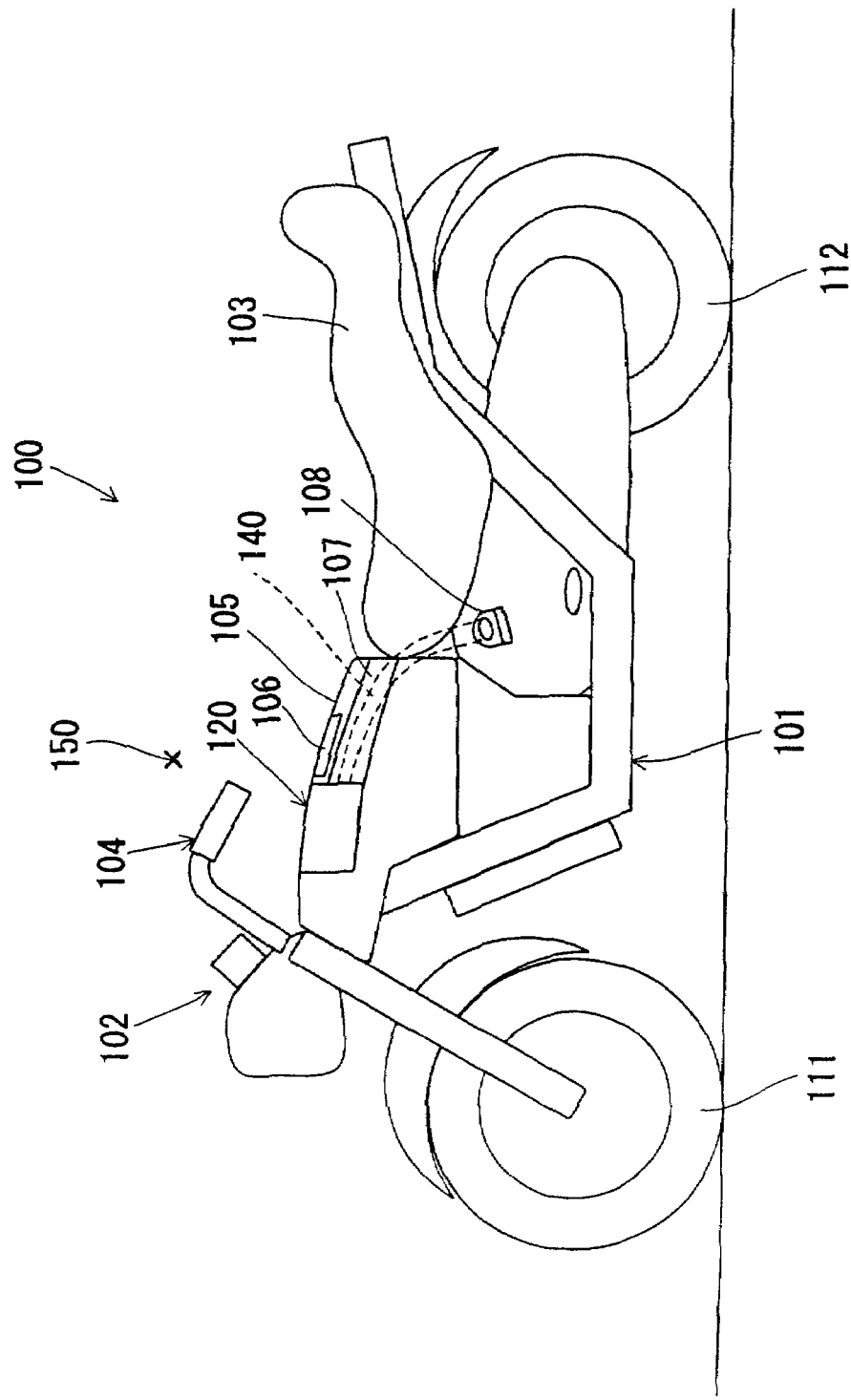
FIG. 1 is a side view of a motorcycle 100 according to an embodiment of the invention, in which an airbag system 120 is mounted to the motorcycle 100.
Figure 2:
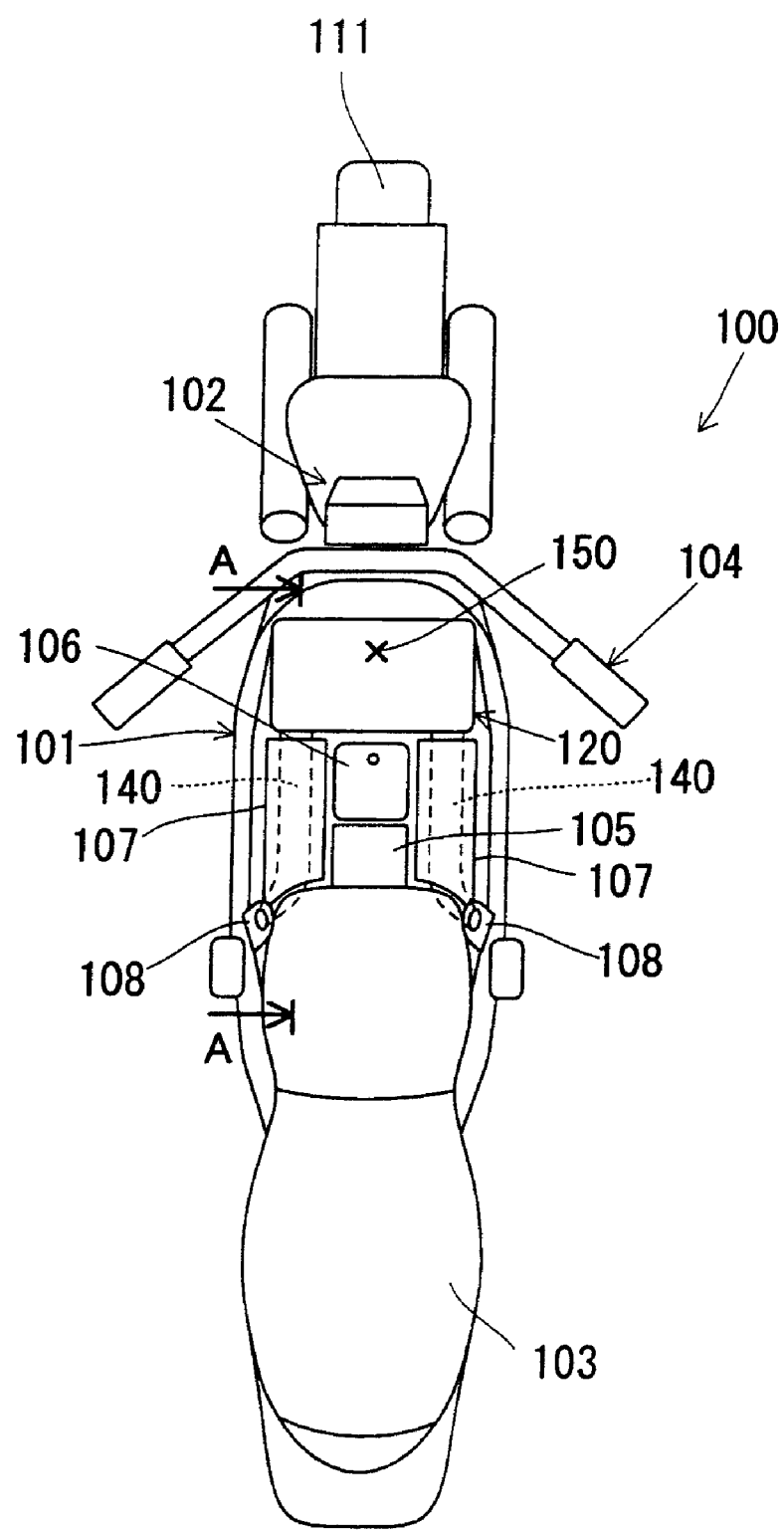
FIG. 2 is a top view of the motorcycle 100 in FIG. 1.

The present invention will be further illustrated with examples below. Referring first to FIGS. 1 and 2, the entire structure of a motorcycle 100 will be described. FIG. 1 is a side view of the motorcycle 100 according to an embodiment of the invention, to which an airbag system 120 is mounted. FIG. 2 is a top view of the motorcycle 100 in FIG. 1. The motorcycle 100 of the embodiment corresponds to the "motorcycle" of the invention.

As shown in FIGS. 1 and 2, the motorcycle 100 is a so-called touring motorcycle mainly composed of a body frame 101 including an engine and a main frame; a seat 103 that a rider can straddle; a handlebar 104; a front wheel 111; and a rear wheel 112.

The region above the body frame 101 of the motorcycle 100 and in front of the rider seated in the seat 103 is specified as a rider restraint region 150 in the event of a head-on collision of the motorcycle 100. The "head-on collision" in the embodiment broadly includes that the motorcycle 100 collides with a front object (not shown for convenience sake, for example, motorcycles, various vehicles other than motorcycles, pedestrians, obstacles, or guardrails). The "rider restraint region 150" of this embodiment corresponds to the "rider restraint region" of the invention, which is defined as a space extending in the direction of the forward movement of the rider seated in the seat 103 by a kinetic energy during a head-on collision, for restraining the rider who is flung ahead of the motorcycle 100.

A front part 102 of the body frame 101 at the front of the vehicle has a headlight, various meters, switches, a windshield and so on. A fuel tank 106 is disposed in front of a vehicle component 105 in the region between the front part 102 and the seat 103. An airbag system (also referred to as an airbag module) 120 is disposed ahead of the fuel tank 106. The fuel tank 106 is provided with webbing covers 107 on both sides thereof, for covering a pair of right and left webbings 140 which is a component of the airbag system 120. In a normal state in which the airbag system 120 is not operating, the webbings 140 extend in the housing space between the webbing covers 107 and the vehicle component 105, so that they cannot be seen or hardly seen from the exterior by the covering of the webbing covers 107. The details of the webbings 140 will be described later in the description of the structure of the airbag system 120.

Figure 3:
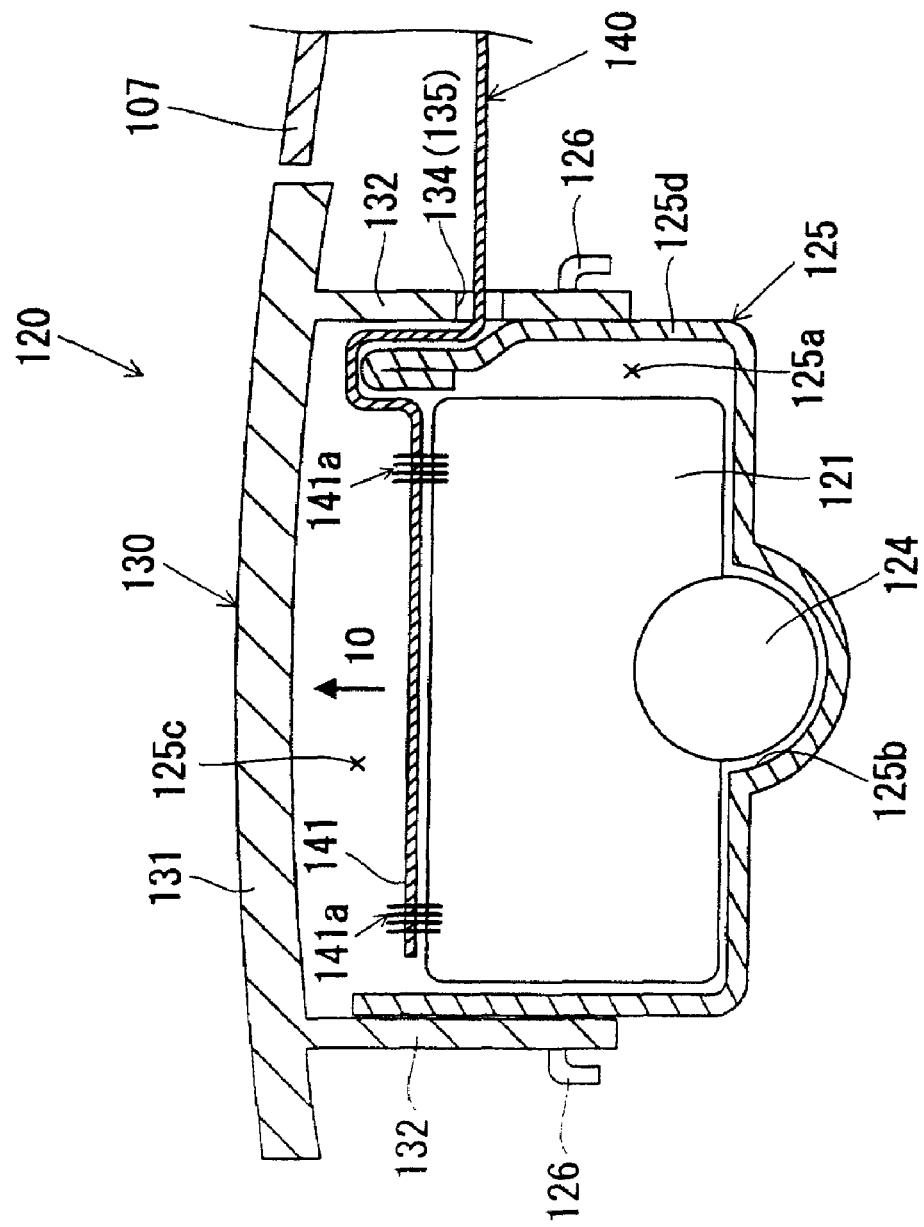
FIG. 3 is a cross sectional view of the motorcycle 100 taken along line A-A of FIG. 2.
Figure 4:
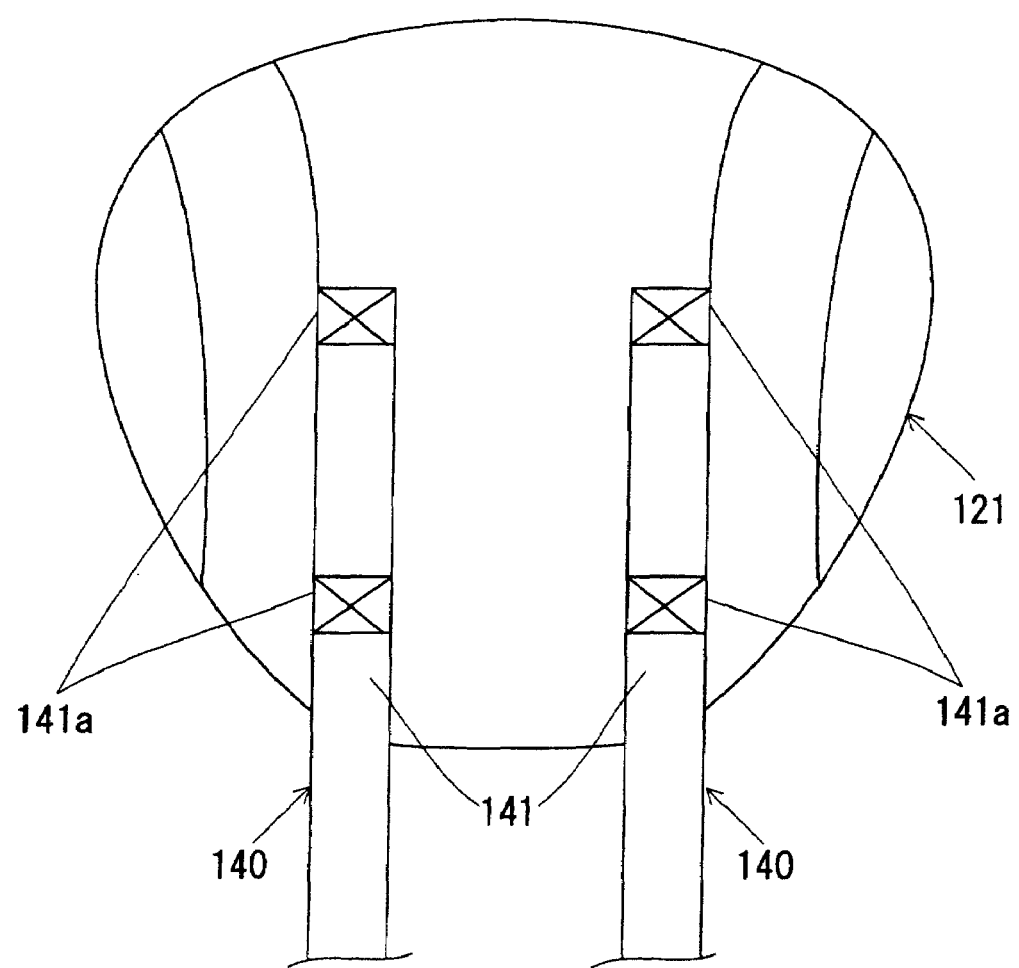
FIG. 4 is a plan view of an airbag 121 before it is housed in a retainer 125 in the airbag system 120 of FIG. 2.

Referring to FIGS. 3 and 4, the structure of the airbag system 120 of this embodiment will be specifically described. FIG. 3 shows the cross section of the motorcycle 100 taken along line A-A of FIG. 2. FIG. 4 is a plan view of an airbag 121 in the airbag system 120 of FIG. 2 before it is housed in a retainer 125. The airbag system 120 is disposed so as to face the rider restraint region (the rider restraint region 150 in FIG. 1) for the rider seated in the seat 103. The airbag system 120 corresponds to the "motorcycle airbag system" of the invention.

Referring to FIG. 3, the airbag system 120 of the embodiment is mainly composed of the airbag 121, an inflator 124, the retainer 125, a module cover 130, and the webbings 140. In FIG. 3, the right is the rear of the vehicle, and the left is the front of the vehicle.

As shown in FIG. 4, the airbag 121 has stitched portions 141a to which a first end 141 of each webbing 140 is sewn. In this embodiment, the stitched portions 141a are provided at a rider's head restraint portion (a rider's head restraint portion 122a, to be described later), so that the webbings 140 are attached to the rider's head restraint portion. The airbag 121 is made of the same material as that of car airbags into the shape of a bag, and is housed in the retainer 125 in a predetermined folded state such that the stitched portions 141a with the webbings 140 are disposed upward. Referring to FIG. 3, the direction of the protrusion (deployment) of the airbag 121 in a collision is indicated by arrow 10. The airbag 121 corresponds to the "airbag" of the invention.

Each webbing 140 is a long tether, the first end 141 of which is stitched to the airbag 121, and a second end is connected to a fastener (a fastener 108 in FIGS. 1 and 2) of the body. The webbings 140 extend in parallel at two portions in the front-back direction between the airbag system 120 and the body of the motorcycle 100 to connect the airbag 121 to the body. This ensures the stability of the inflated airbag 121 in restraining the rider with the webbings 140. Particularly, the use of the pair of right and left webbings 140 allow the rider-restraining stability to be improved by balancing the deployment of the right and left of the airbag 121. The webbings 140 are made of the same webbing material as that of car seatbelts (shaped like a belt-like member made of resin fibers) or the same material as that of an airbag fabric into the shape of a belt. The webbings 140 may be shaped like a strap in place of the belt. The webbing 140 to be attached to the airbag 121 may be one or more as appropriate.

An inflator 124 is configured as a device for generating airbag-inflation gas at a vehicle collision so that the airbag 121 in a folded state is inflated while deploying from the retainer 125 and for supplying the gas into the airbag 121. The inflator 124 may be configured such that either it is housed in the bag-shaped airbag 121 and supplies the generated airbag-inflation gas directly into the airbag 121, or it is connected to the airbag 121 through a gas supply passage (corresponding to the "gas supply section") and indirectly supplies the generated airbag-inflation gas into the airbag 121 through the gas supply passage. The inflator 124 corresponds to the "inflator" of the invention.

The retainer 125 is a bottomed-box casing for housing the airbag 121 in the folded state and the inflator 124. Specifically, the retainer 125 has at least an airbag housing portion 125a for housing the airbag 121 and an inflator housing portion (recessed portion) 125b for housing the inflator 124. An airbag opening 125c at the top of the retainer 125 allows the deployment of the airbag 121. With the airbag 121 in a housed state, the webbings 140 are disposed inside the outer shape of the retainer 125 and on the top of the airbag opening 125c. The retainer 125 corresponds to the "housing case" of the invention, and the airbag opening 125c corresponds to the "opening of the housing case" of the invention.

The module cover 130 covers the airbag 121 in a housed state by covering the airbag opening 125c of the retainer 125 from above, and has at least a top plate 131 and a depending portion 132. The module cover 130 is typically made of a resin material by die molding. The top plate 131 of the module cover 130 is a plate extending substantially horizontally along the plane of the airbag opening 125c of the retainer 125 to define the upper surface of the airbag system 120. The depending portion 132 of the module cover 130 is a plate-like member extending from the lower surface (back surface) of the top plate 131 in the vertical direction crossing the extension of the top plate 131 along the wall 125d of the retainer 125 (mounted portion). The part of the depending portion 132 adjacent to the rear of the vehicle (adjacent to the rider) has a pair of left and right webbing through holes 134 that communicate the interior and the exterior of the module cover 130 with each other. This allows the webbings 140 to extend from the interior to the exterior of the module cover 130. The depending portion 132 is fixed to the retainer wall 125d with fasteners 126, so that the module cover 130 and the retainer 125 are joined to each other. The webbing through holes 134 are provided at a thin portion (fragile portion) of the depending portion 132, that is, a tear line 135.

Figure 5:
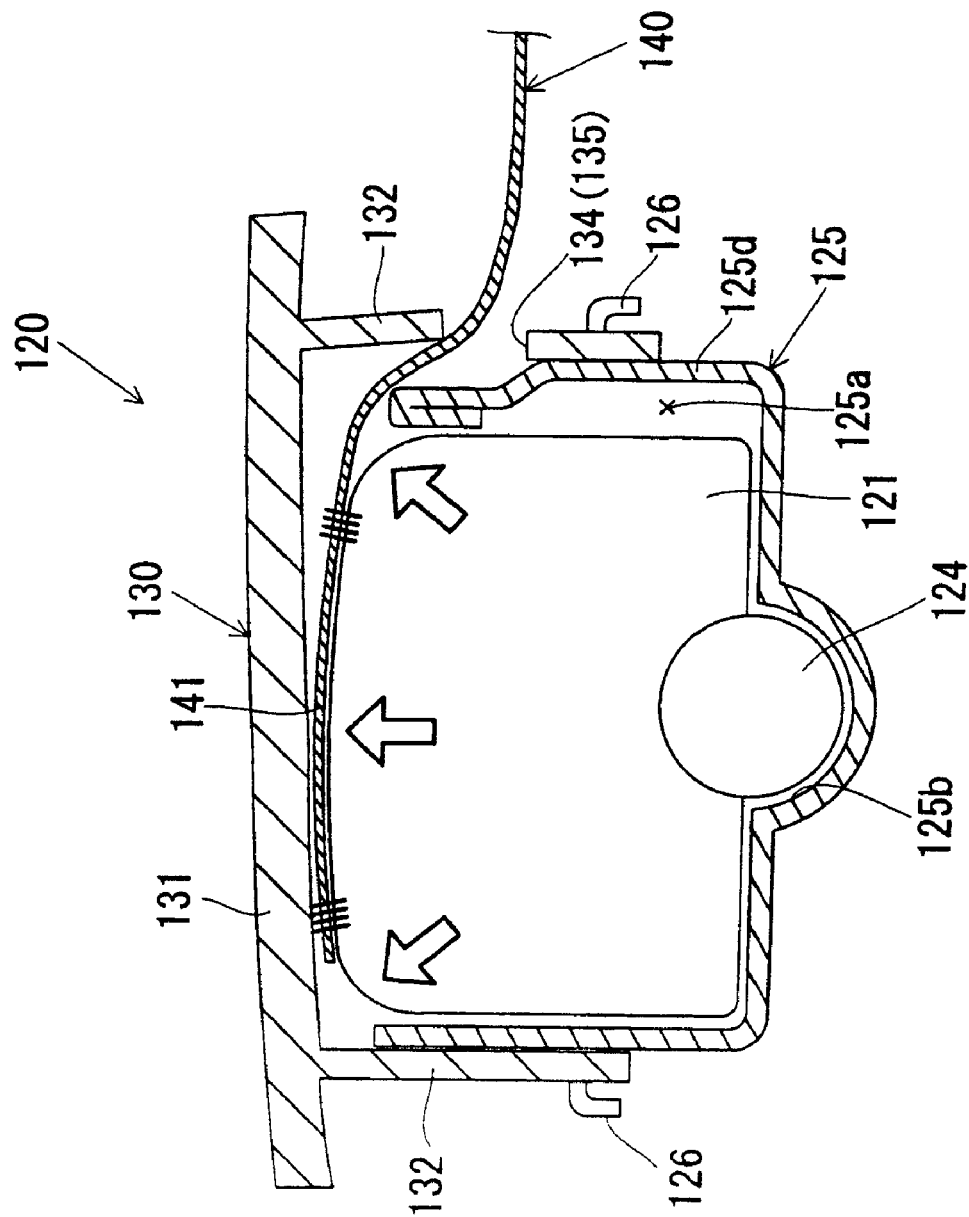
FIG. 5 is a diagram of the airbag 121 in an early stage of the deployment in the airbag system 120 of the embodiment.
Figure 6:
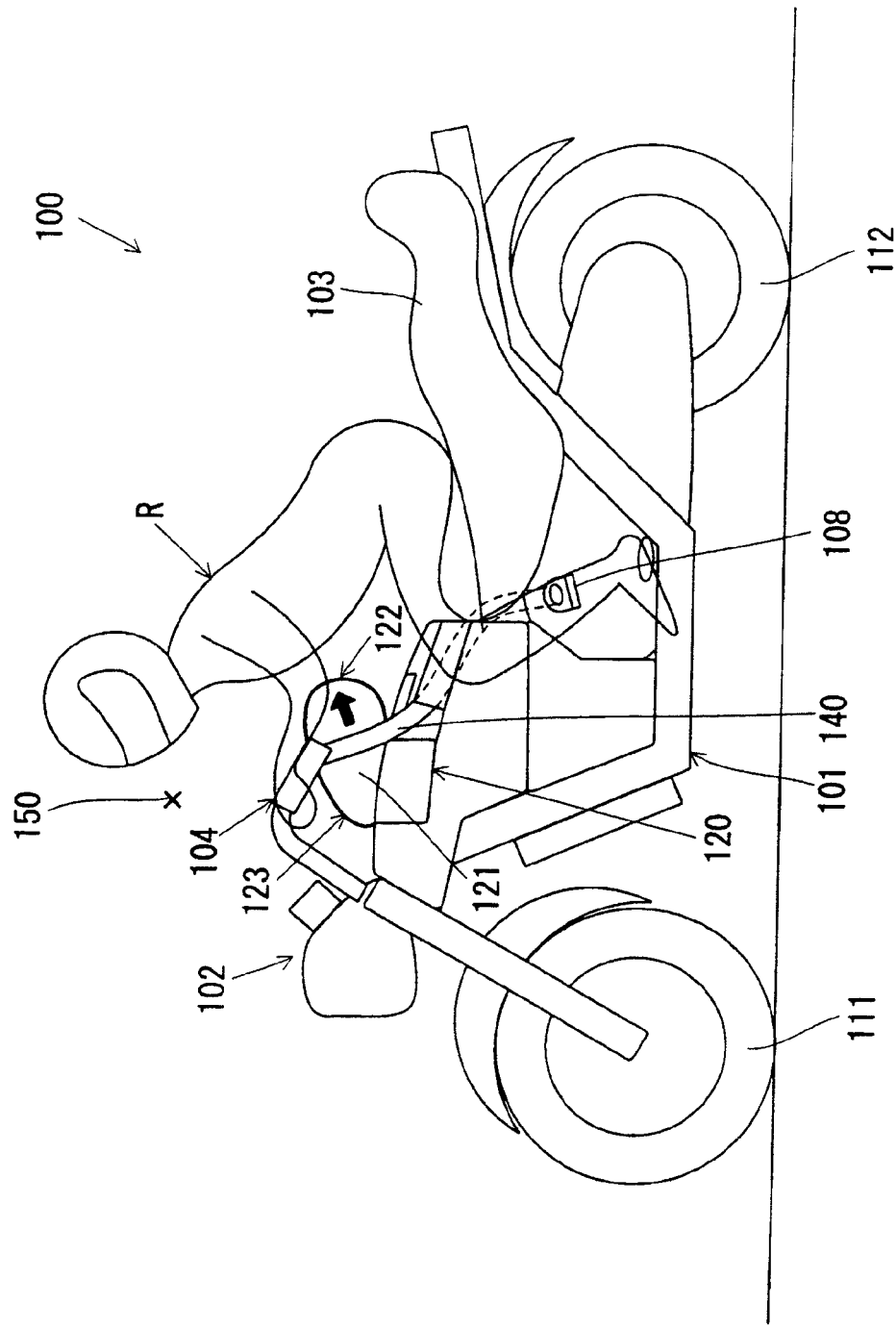
FIG. 6 is a diagram of the airbag 121 in an early stage of the deployment in the airbag system 120 of the embodiment.
Figure 7:
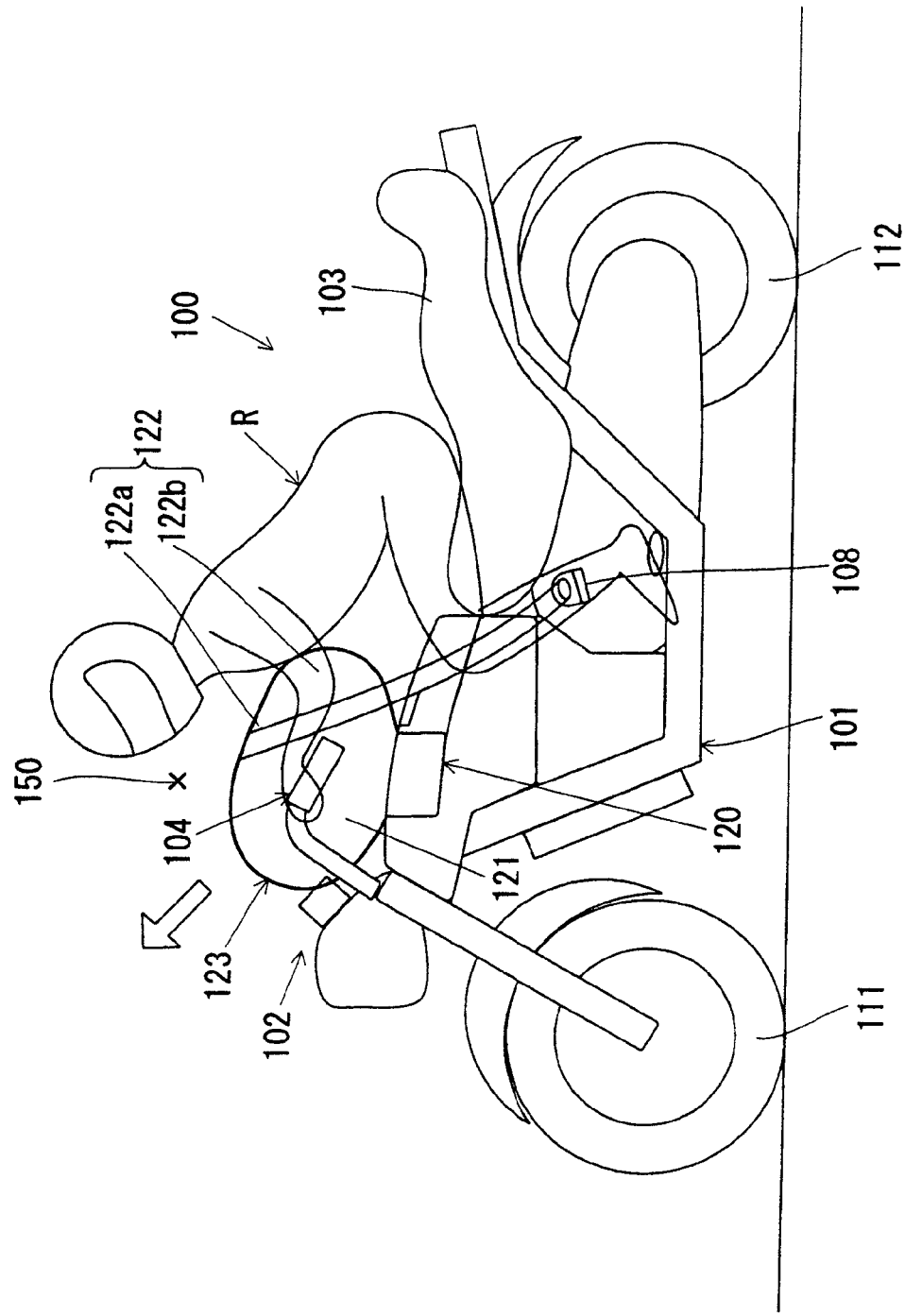
FIG. 7 is a side view of the motorcycle 100 when the airbag 121 of the embodiment is in the middle of deployment.
Figure 8:
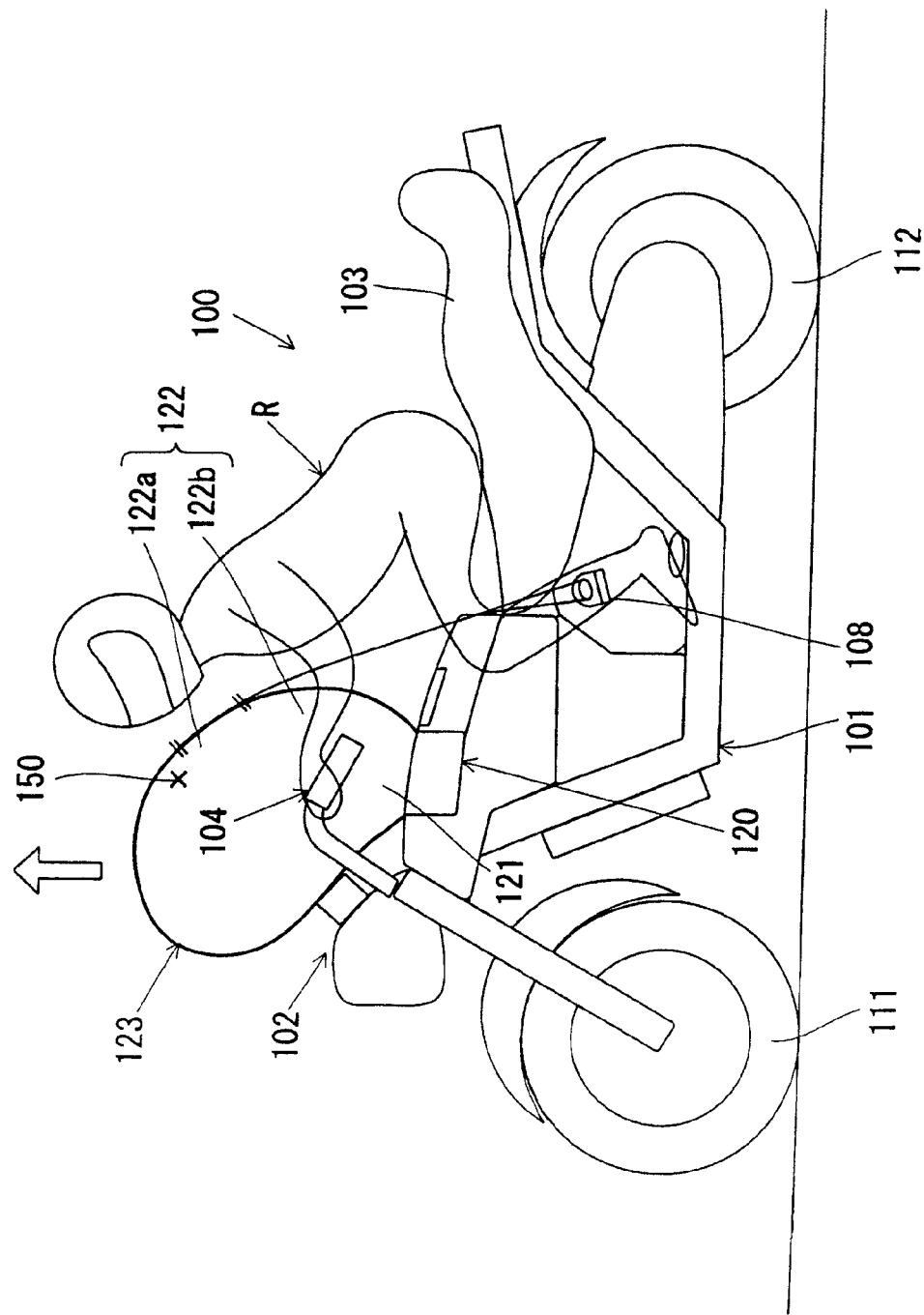
FIG. 8 is a side view of the motorcycle 100 when the airbag 121 of the embodiment is in the middle of deployment.
Figure 9:
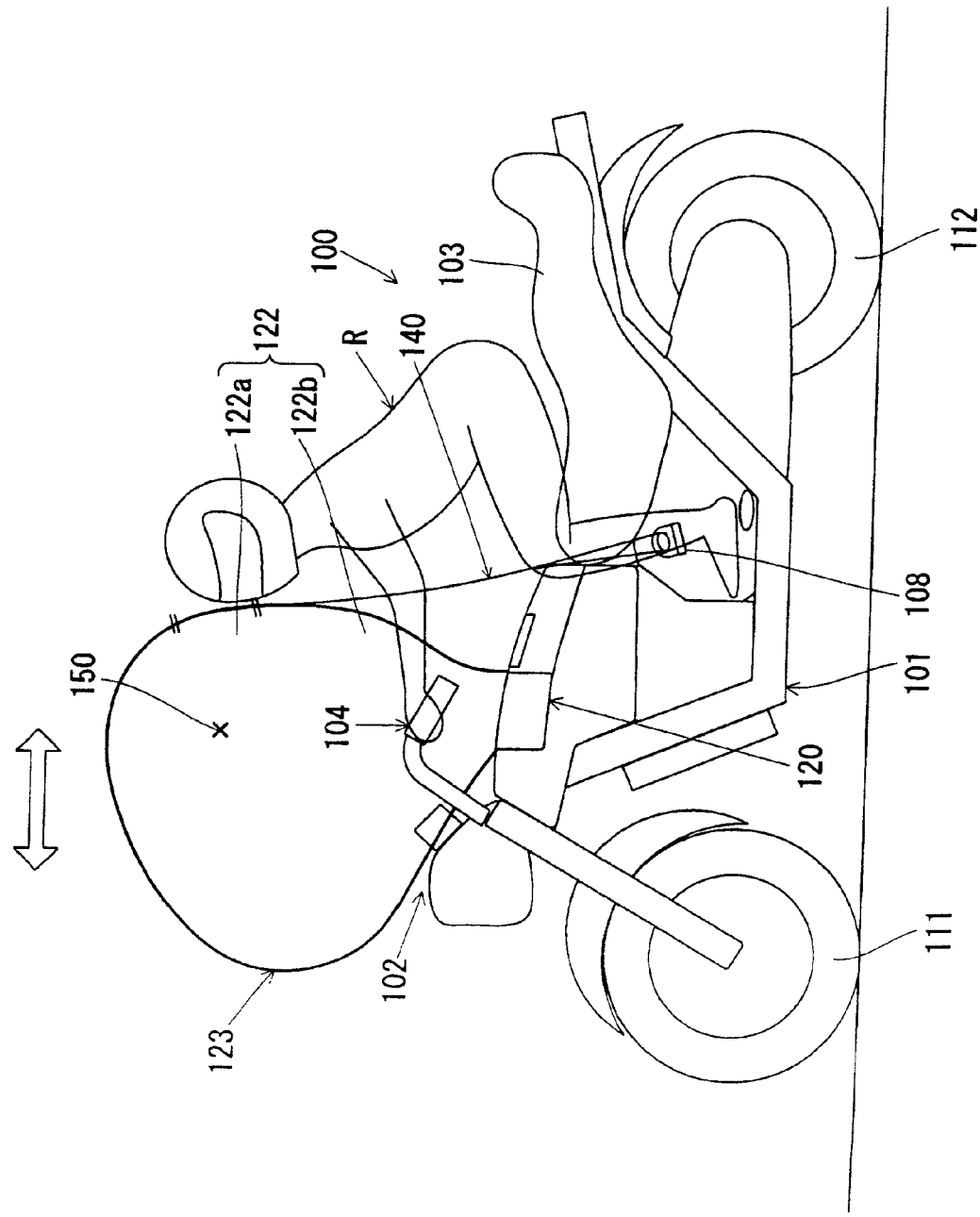
FIG. 9 is a side view of the motorcycle 100 when the airbag 121 of the embodiment is in the middle of deployment.
Figure 10:
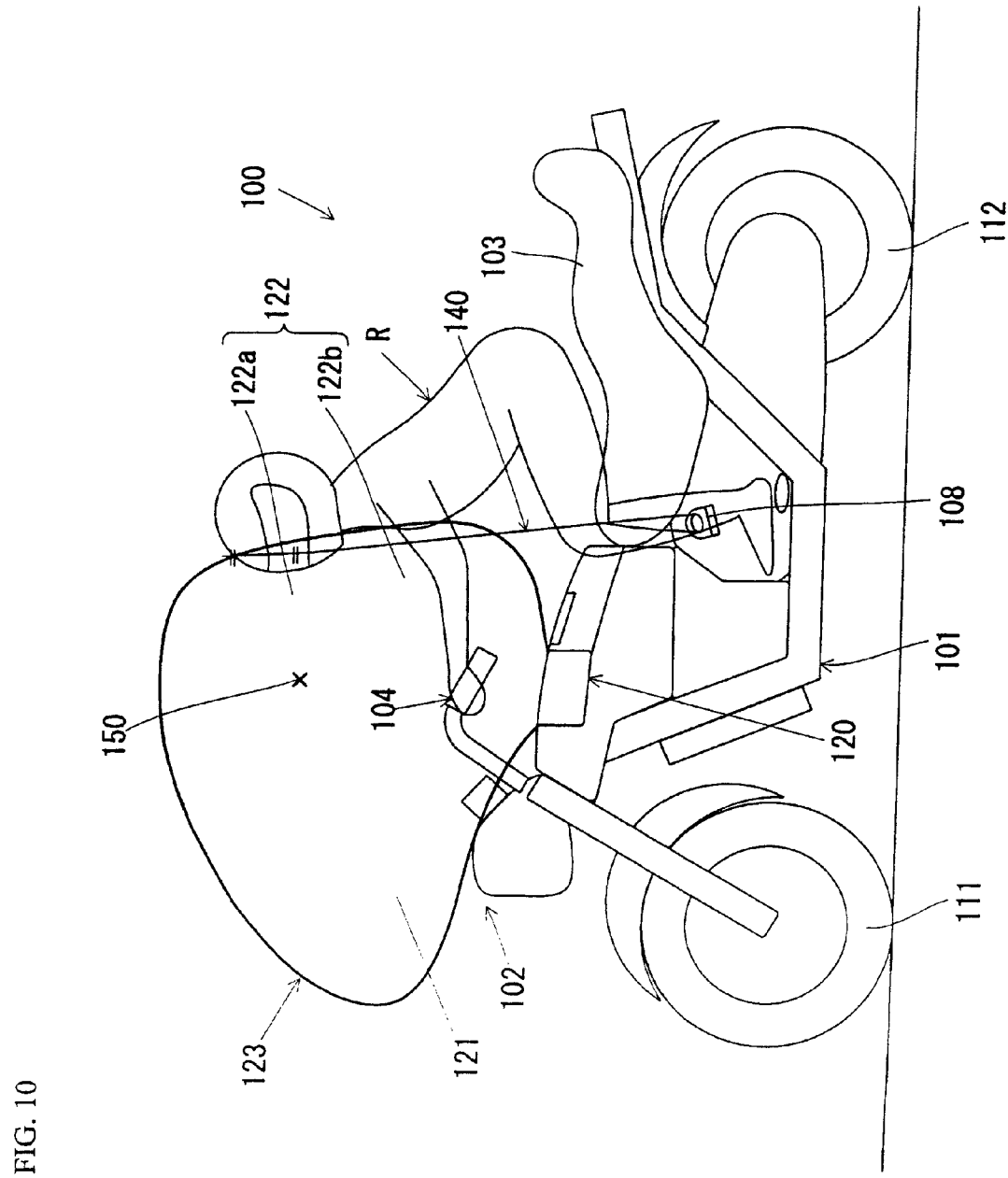
FIG. 10 is a side view of the motorcycle 100 when the airbag 121 of the embodiment has fully deployed.

The operation of the airbag system 120 with this arrangement will be described with reference to FIGS. 5 to 10. FIGS. 5 and 6 show the airbag 121 in an early stage of the deployment of the airbag 121 of the airbag system 120 of the embodiment; FIGS. 7 to 9 show the motorcycle 100 in the middle of the deployment of the airbag 121, as viewed from the side; and FIG. 10 shows the airbag 121 after completion of the deployment, as viewed from the side.

When the motorcycle 100 comes into a collision in the traveling direction, the rider is moving (being flung) ahead of the motorcycle 100. In the embodiment, upon detection of the head-on collision, the inflator 124 of the airbag system 120 is activated to start to supply the inflation gas generated by the inflator 124 into the airbag 121. Thus, the airbag 121 starts to protrude (deploy) in the direction of arrow 10 in the airbag system 120 of FIG. 3 in an inoperative state. Since the inflation gas is continuously supplied into the airbag 121, the airbag 121 sequentially forms an inflated section from the inflator 124.

Referring to FIG. 5, directly after the activation of the airbag system 120, the airbag 121 pushes the top plate 131 of the module cover 130 from below by the deploying force. When receiving the deploying force from the airbag 121, the top plate 131 is torn open along the tear line 135 to deploy to the front of the vehicle with the front of the depending portion 132 as a hinge to release the cover of the airbag opening 125c of the retainer 125. This allows the deployment of the airbag 121, so that the airbag 121 protrudes out of the retainer 125 through the airbag opening 125c of the retainer 125. Upon the deployment of the airbag 121, a tensile load is started to be applied to the webbings 140 stitched to the airbag 121 through the first ends 141. Thus, the webbings 140 push open the webbing covers 107 upward to release the covering by the webbing covers 107.

As shown in FIG. 6, the airbag 121 inflates earlier in the rider-side airbag part 122 than the other airbag parts including the front airbag part 123 at the early stage of the inflation in the event of the head-on collision of the motorcycle. Thus, the rider R is quickly restrained by the inflated rider-side airbag part 122.

For the airbag system 120 of this type to be mounted to a motorcycle, it is desirable that the airbag 121 (the rider-side airbag part 122) not only inflate to the rider restraint region 150 ahead of the rider R but also inflate according to the situation. Specifically, when the airbag 121 first inflates toward the head of the rider who leans forward in a head-on collision of the motorcycle, the load from the airbag 121 applied in the direction opposite to the moving direction of the rider may be applied to the rider's head.

Therefore, this embodiment proposes a technique for further improving rider restraint performance not only by inflating the airbag to the rider restraint region but also by taking the order of deployment to the rider's head or the rider's chest into consideration. Specifically, the embodiment is constructed such that when the airbag 121 shown in FIG. 6 further inflates, the webbings 140 disposed on the airbag 121 and attached to the rider's head restraint portion 122a restrict the deploying action of the airbag 121, thereby controlling the deploying action. The webbings 140 here correspond to the "webbing" of the invention.

With this arrangement, as shown in FIG. 7, the deployment of the rider's head restraint portion 122a of the rider-side airbag part 122 toward the rider's head is restricted by the webbings 140, so that a rider's chest restraint portion 122b first deploys toward the rider's chest and then the rider's head restraint portion 122a deploys toward the rider's head. The "rider's head restraint portion 122a" here is a region for mainly restraining the head or the face of the rider R, while the "rider's chest restraint portion 122b" is a region for mainly restraining the chest of the rider R. The "rider's head restraint portion 122a" here corresponds to the "rider's-head restraint portion" of the invention and the "rider's chest restraint portion 122b" corresponds to the "rider's-chest restraint portion" of the invention. With the rider's chest restraint portion 122b first deploying toward the rider's chest, the rider's chest restraint portion 122b pushes the chest of the rider R in a forward leaning posture toward the rear of the vehicle while softly receiving it, thereby raising the upper body of the rider R. In this state, the deployment of the rider's head restraint portion 122a toward the rider's head is restricted by the webbings 140, allowing decreasing the load applied to the head of the rider R from the rider's head restraint portion 122a in the direction opposite to the movement of the rider R.

Then, in the airbag 121 shown in FIG. 7, the front airbag part 123 protrudes to the front of the vehicle (for example, along the empty arrow in FIG. 7) by the action of restricting the rider's head restraint portion 122a by the webbings 140, and then protrudes upward (for example, along the empty arrow shown in FIG. 8) through the deployment shown in FIG. 8. The front airbag part 123 protruding upward comes into the front of the head of the rider R, as shown in FIG. 9. Thus, this embodiment is configured such that the rider's chest restraint portion 122b first deploys toward the rider's chest, and then the rider's head restraint portion 122a deploys toward the rider's head, thus allowing the rider restraint performance by the airbag 121 to be improved while softly receiving the rider R with the airbag 121.

Furthermore, the whole of the airbag 121 protrudes in the front-back direction (for example, along the empty arrow in FIG. 9) into a fully inflated state in which the airbag 121 has completely deployed, as shown in FIG. 10. In this fully inflated state, the inflated airbag 121 fills the rider restraint region 150 in front of the rider R, so that the rider R who is moving forward by the kinetic energy in a collision is restrained by the inflated airbag 121.

In this fully inflated state, the webbings 140 extend fully substantially in a straight line between the airbag 121 and the fastener 108, thereby restricting the upward and forward action of the airbag 121 by the tension of the webbings 140. The fully inflated airbag 121 comes into contact with the front part 102 at the front and with the handlebar 104 at both ends. This arrangement can stabilize the restraint of the rider R with the fully inflated airbag 121.

Thus, according to this embodiment, the webbings 140 restrict the deployment of the airbag 121 toward the rider's head, so that, the rider's chest restraint portion 122b of the parts of the airbag 121 is first inflated toward the rider's chest, and then the rider's head restraint portion 122a is inflated toward the rider's head. This arrangement allows a decrease in the load applied to the head of the rider R from the rider's head restraint portion 122a. This embodiment particularly provides a strategic arrangement in which the webbings 140 for connecting the airbag 121 to the motorcycle are used as a device for restricting the deployment of the airbag 121 toward the rider's head.

It is to be understood that the invention is not limited to the foregoing embodiment but various applications and modifications may be made. For example, the following embodiments to which the foregoing embodiment is applied may be made.

Although the embodiment has been described for the touring motorcycle 100, the invention may also be applied to other types of motorcycle such as a motor scooter that has a space for lateral movement of the rider's legs between the handlebar and the seat, or motorcycles other than the motorcycle 100.

Although the embodiment has been described for the case in which the airbag system 120 is disposed in front of the fuel tank 106, the position of the airbag system 120 can be varied as appropriate provided that the airbag 121 can deploy in a desired region. The airbag system 120 may be disposed behind or lower than the position shown in FIG. 1.

What is claimed is:

1. An airbag apparatus for a motorcycle, the airbag apparatus comprising:
    a multi-stage airbag to be deployed and inflated in rearward, forward and upward directions for protecting a rider of the motorcycle, the airbag including a forward inflated portion and a rearward inflated portion;
    upper and lower portions of the airbag rearward portion;
    a retainer for housing the airbag in a folded state and having an upper opening through which the airbag is deployed;
    a cover that extends over the retainer opening with the airbag in the folded state in the retainer;
    a forward hinge connection between the cover and the retainer so that during an initial stage of the airbag deployment the inflating airbag causes the cover to pivot forwardly with the lower portion of the airbag rearward inflated portion projecting out of a rearward portion of the retainer opening uncovered by the forwardly pivoted cover; and
    at least one tether secured at one end thereof to the upper portion of the airbag rearward portion, the tether having a portion including the one end thereof that extends along and is disposed completely above the airbag in the folded state thereof with the entire folded airbag disposed below the tether portion so that during a subsequent deployment stage after the initial deployment stage the at least one tether substantially restricts deployment of the upper portion of the airbag rearward portion against deploying toward the head of the motorcycle rider causing the airbag forward portion to deploy in the forward direction from the retainer prior to deployment of the upper portion in the upward direction, and during a final deployment stage the upper portion is deployed in the upward direction with the airbag deployment stages being for engaging the chest of the motorcycle rider with the airbag before the head of the motorcycle rider is engaged therewith.

2. The airbag apparatus of claim 1 wherein the at least one tether is secured at another end to the motorcycle.

3. The airbag apparatus of claim 1 wherein the retainer has upstanding walls having upper ends forming the upper opening and the at least one tether is secured to the upper portion of the airbag rearward portion adjacent the cover when the airbag is in the folded state.

4. The airbag apparatus of claim 3 wherein the upper portion of the airbag rearward portion secured to the at least one tether during the folded state exerts a deployment force on the cover such that the airbag deploys through the retainer opening.

5. The airbag apparatus of claim 3 wherein the upper portion of the airbag rearward portion secured to the at least one tether is generally parallel to the retainer cover when the airbag is in the folded state.

6. The airbag apparatus of claim 1 wherein the at least one tether comprises a pair of tethers each secured at one end to the upper portion of the airbag rearward portion and secured at another end to the motorcycle, the pair of tethers being secured to opposing sides of the motorcycle.

7. A motorcycle comprising:
    a body extending in a fore-and-aft direction and including a seat for a rider;
    an airbag to be deployed and inflated generally forwardly of the seat and a rider of the motorcycle thereon;
    a rearwardly facing surface of the fully inflated airbag for facing the motorcycle rider;
    a head constraining upper surface portion of the rearwardly facing surface of the fully inflated airbag;
    an upper body lower constraining surface portion of the rearwardly facing surface of the fully inflated airbag;
    an inflator for supplying inflation gas to the airbag;
    a retainer for housing the airbag in a folded state;
    a cover hingedly connected to the retainer to pivot open forwardly upon airbag deployment so that the upper body lower constraining surface portion contacts the rider before the head constraining surface portion; and
    at least one tether fixedly secured at one end thereof to the head constraining upper surface portion of the airbag rearwardly facing surface prior to airbag deployment such that during deployment of the airbag, the airbag has a forward portion that is inflated forwardly before the airbag is inflated upwardly so that the head constraining upper surface portion contacts the rider after the upper body lower constraining surface portion, and after full inflation of the airbag, the one end of the tether fixedly secured at the upper surface portion of the rearwardly facing surface faces rearwardly therewith toward the motorcycle rider.

8. The motorcycle of claim 7 wherein the at least one tether is secured at another end to the motorcycle.

9. The motorcycle of claim 7 wherein the retainer has upstanding walls having upper ends forming an opening with the cover disposed to extend over the opening, and the at least one tether is secured to the upper surface portion of the airbag rearward surface adjacent the cover when the airbag is in the folded state.

10. The motorcycle of claim 7 wherein the at least one tether comprises a pair of tethers each secured at one end to the head constraining upper surface portion of the airbag and secured at another end to the motorcycle body, the pair of tethers being secured to opposing sides of the motorcycle body.

11. The motorcycle of claim 7 wherein the cover includes a rearward depending wall having a frangible portion and a through opening with the at least one tether extending therethrough such that airbag deployment causes the rearward depending wall to break at the frangible portion thereof and the cover to pivot forwardly open.

* * * * *